March 24, 1964 W. Z. STEPNIEWSKI ETAL 3,126,171
INTEGRATED LIFT AND PROPULSIVE SYSTEM FOR AIRCRAFT
Filed Oct. 15, 1962 2 Sheets-Sheet 1

INVENTORS:
FRANCIS J. McHUGH
WIESLAW Z. STEPNIEWSKI
BY
ATTORNEYS

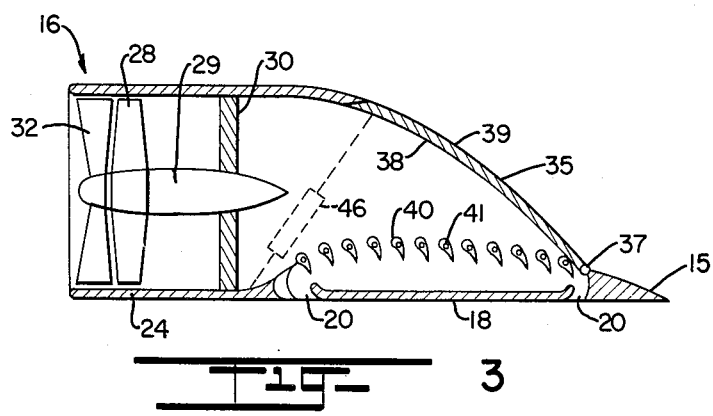
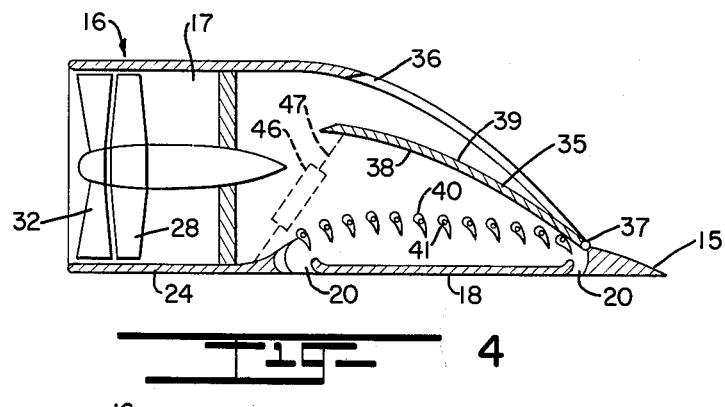
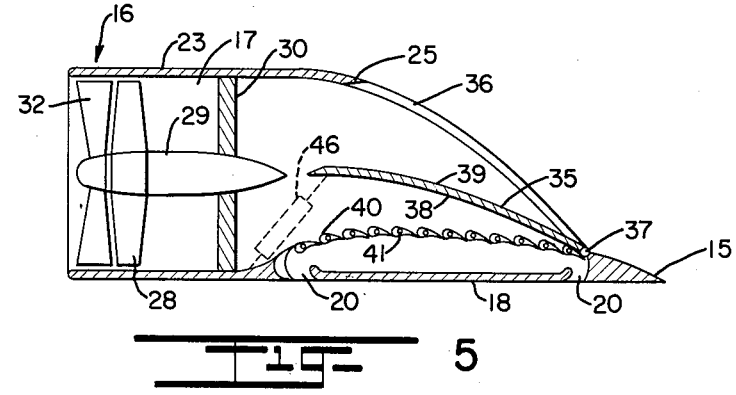

United States Patent Office 3,126,171
Patented Mar. 24, 1964

3,126,171
INTEGRATED LIFT AND PROPULSIVE SYSTEM
FOR AIRCRAFT
Wieslaw Z. Stepniewski, Springfield, and Francis J.
McHugh, Prospect Park, Pa., assignors to The Boeing
Company, Seattle, Wash., a corporation of Delaware
Filed Oct. 15, 1962, Ser. No. 230,459
10 Claims. (Cl. 244—12)

This invention generally relates to aircraft and, more particularly, to short and vertical takeoff and landing as well as ground effect takeoff and landing aircraft incorporating a novel and improved propulsive system, which enables smooth transition of the aircraft between forward flight and hovering and/or vertical flight with substantially constant lift.

In vertical and short takeoff and landing aircraft, it is highly desirable to improve the lift forces available, especially during transitions from hover to forward flight. The sole use of turning vanes and other similar relatively small lift areas has been found to exhibit many drawbacks. One drawback is the tendency to obstruct the flow of air. This is particularly so in forward flight. Furthermore, the vectoring of thrust from a vertical (lifting) position to a horizontal (propulsive) position is usually accompanied by an early loss of lift. In this connection, it is especially desirable to provide an effective control surface, which will permit integration of the lift and propulsive system for the aircraft in such a way as to enable a substantial increase in horizontal thrust without significant reduction in overall lift characteristics.

Accordingly, it is a principal object of the present invention to overcome a number of drawbacks and disadvantages in prior art propulsive systems for aircraft and, in doing so, to provide for an improved, integrated lift and propulsive system conformable for use with various types of aircraft.

It is another object of the present invention to provide an integrated lift and propulsive system for aircraft, which is capable of bringing about smooth transition of the aircraft from hover to forward flight without significantly sacrificing lift.

It is a further object to provide for a control surface so constructed and arranged in relation to a propulsive system for an aircraft as to simultaneously control both the lift and forward flight characteristics; moreover, wherein the control surface is simplified in construction and relatively compact without necessitating any modification in exterior configuration of the aircraft and which is further adapted for use with conventional aircraft propulsive systems and units.

An additional object of the present invention is to make provision in vertical takeoff and landing and ground effect takeoff and landing aircraft for control surface means, which, in combination with the propulsive system of the aircraft, is capable of producing an incremental lifting force during forward flight closely approximating the decrement of lift resulting from reduced air flow to the vertical lift system.

In accordance with the present invention, one embodiment thereof is characterized by an airfoil section traversing the flow of discharge air from the propulsion unit of an aircraft, and which airfoil section is angularly adjustable to present a rearwardly and outwardly directed control surface at or adjacent to the outlet end of the discharge passage for controlling the directional thrust resulting from the discharge of air therethrough. In short and/or vertical takeoff and landing aircraft including ground effect takeoff and landing aircraft, the airfoil section preferably is mounted in the main flow passage to act as a deflector for a part or all of the discharge air to direct the air toward a downwardly directed duct system of the aircraft so as to produce vertical lift in a more or less conventional manner. In transition from hover or vertical flight to forward flight, however, the airfoil section is movable to permit a rearward flow of increasingly greater quantities of air with correspondingly reduced amounts of air being deflected through the vertical lift system. To compensate for the resultant reduction in lift, the outer control surface is acted upon by the discharge air to produce an increasingly greater lifting force, but without obstructing the flow of air or reducing the efficiency of the aircraft in forward flight. As an additional feature, an improved vertical lift system has been devised, which in cooperation with the airfoil section will result in a vertically downward flow of air throughout, and which can be separately controlled and regulated without affecting the angular disposition of the airfoil section.

Other objects and advantages of this invention will be readily perceived from the following description, claims, and drawings.

This invention relates to an aircraft having a body including a propulsion unit, and an air discharge duct defining a discharge flow passage for the propulsion unit in combination with an adjustable airfoil section. The adjustable airfoil section traverses the outlet end of the flow passage and is mounted for angular movement across the flow passage to control the capacity of air flow therethrough. The airfoil section has an outer control surface, which extends rearwardly and outwardly to control direction of thrust by the discharge of air through the outlet end. The airfoil section also includes means for adjustably controlling the angular disposition of the airfoil section in the flow passage.

This invention further relates to an integrated lift and propulsion unit for an aircraft comprising a housing with a main passage therein. Means are included in the main passage for moving air therethrough. The housing has a first discharge outlet and means for controlling air flow through the first discharge outlet to provide lift and for selectively blocking air flow through the first outlet. The housing also has a second discharge outlet and means movable into and out of the second outlet for controlling air flow therethrough and for reacting to the air flow through the second outlet to provide lift. Accordingly, as the first outlet is being closed and lift therefrom decreases and as the second outlet is being opened and forward thrust and lift from the movable means increases an incremental lifting force is produced that approximates the decrement of lift resulting from reduced air flow through the first outlet.

Additionally, this invention relates to aircraft including a fuselage and wings in combination with a nacelle mounted on an upper surface of each wing. The nacelle defines a discharge passage including a propulsion unit at the inlet end and deflecting means at the outlet end. The diverting means divert air downwardly from the discharge passage including a propulsion unit at the inlet end and deflecting means at the outlet end. The diverting means divert air downwardly from the discharge passage through an opening formed at the intersection of the nacelle and wing. Peripheral downwardly directed slots are disposed in the lower surface of each wing and are in communication with the discharge passage. Adjustable turning vanes extend transversely across the opening formed between the nacelle and wing. The turning vanes are angularly disposed in relation to the flow of air diverted by the deflecting means to provide a uniform distribution of air through the slots. The vanes also are movable between an open position for guiding air downwardly through the slots and a closed position to block the downward flow of air from the discharge passage.

FIGURES 3 to 5 are diagrammatic section views showing the relative disposition and arrangement of parts comprising the propulsive system of the present invention during periods of, for example, hover, transition, and forward flight, respectively.

Figure 1:
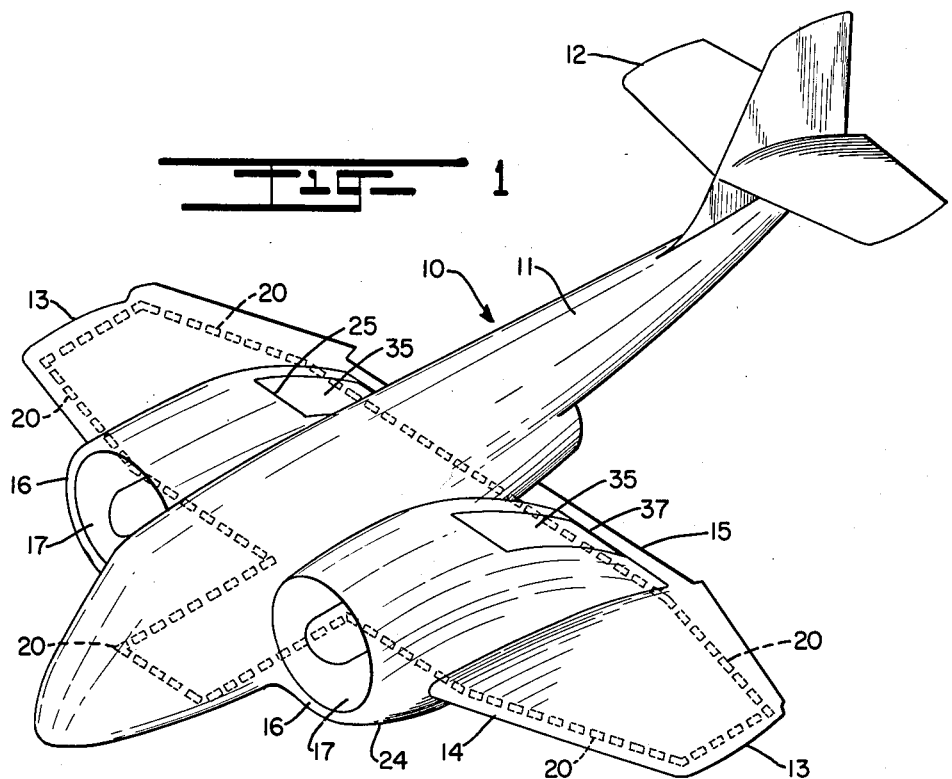
FIGURE 1 is an overall perspective view of an aircraft incorporating a preferred form of integrated lift and propulsive system in accordance with the present invention.
Figure 2:
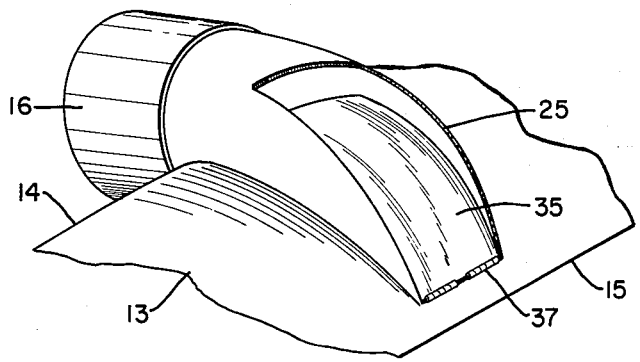
FIGURE 2 is a fragmentary, rear perspective view of the aft portion of one of the nacelles of FIGURE 1.

Referring to the drawings and particularly FIGURES 1 and 2, there is shown an aircraft 10 of the fixed wing type. The aircraft 10 generally comprises a fuselage 11, tail assembly 12, and wings 13 projecting from opposite sides of the forward portion of the fuselage. Each of the wings has a leading edge 14 and a trailing edge 15.

A nacelle 16 is mounted in the upper surface of each wing in adjacent, spaced relation to the fuselage 11. Each nacelle defines a main flow discharge duct or passage 17 for the propulsion unit of a power plant to propel the aircraft.

To develop the necessary lift for vertical ascent or hovering, a vertical duct system is formed in communication with the main flow passages 17. The vertical duct system preferably comprises a series of slots 20 arranged at closely spaced intervals along the peripheral portion of the fuselage 11 and lower surfaces of the wings 13, as represented in FIGURE 1. However, it should be understood that an aircraft capable of short take off and landing operations can employ air discharge openings other than the slots 20. That is, a short takeoff and landing aircraft can employ an opening in the lower surface of each wing directly below the passages 17 for direct downward discharge of air.

The aircraft structure illustrated in FIGURE 1 is intended more as a setting for the present invention and it will be evident from the following that the advantages and features of the present invention would have wide application to a variety of different types of aircraft.

As shown in FIGURES 3 to 5, each nacelle 16 is somewhat enlarged in relation to the wing thickness. Each of the nacelles 16 includes a forwardly projecting cylindrical portion 23 with an under surface 24 defining a forward continuation of the leading edge 14 and an upper surface trailing rearwardly and downwardly at a relatively sharp angle to define an aft wall portion 25. The aft wall portion 25 terminates adjacent to the trailing edge 15.

A propulsion unit is mounted within each nacelle 16 toward the forward end thereof and, in the embodiment shown, is defined by a fan 28 mounted on a fan hub fairing 29, which in turn is connected to a support 30 within the nacelle 16. It should be understood that the support 30 comprises a plurality of rod-like radial members. In this manner, a minimal amount of obstruction of air flow is permitted by support structure.

Guide vanes 32 are positioned on the hub 29 forwardly of the fan 28 so that air flow enters through the guide vanes and is forced rearwardly by the fan 28 through the discharge passage 17. Engines (not shown) may be housed, for example, in the fuselage to drive the fans 28 through a suitable gear arrangement, all in accordance with more or less conventional practice. In general, the power plant described is merely representative of various types of conventional power plants that may be employed in carrying out the objectives of the present invention.

The integrated lift and propulsive system of the present invention is designed to control the directional thrust due to the rearward discharge of air through the passage 17 of each nacelle 16. To accomplish this, a movable aft nacelle door 35, which defines an airfoil section of generally concave-convex cross-sectional configuration, is employed. The door 35 has its lower edge connected in hinged relation at 37 just forwardly of the trailing edge 15 for angular movement through an opening 36 formed in the aft wall portion 25.

The opening 36 is generally rectangular and is aligned with the fan 28 for the continuous horizontal flow of air through the main flow passage 17. While the opening 36 is illustrated in the drawings as being of a size corresponding, in effective cross-sectional area, to that of the inlet end, it should be understood that it may be varied as desired to achieve the desired exit velocity of the air. The nacelle door 35 is hinged for movement about a horizontal axis through the discharge passage from a closed position, which completely blocks the flow of air through the discharge opening 36 (see FIGURE 3), to an open position, which permits the air to discharge horizontally through the opening 36 (see FIGURE 5).

In the closed position (FIGURE 3), it will be noted that the nacelle door 35 conforms in contour to the aft wall or surface portion 25 of the nacelle 16 with its inner concave surface 38 acting as a deflector to divert the air stream downwardly through the vertical duct system. A plurality of vanes 40 cooperate with the door 35 for the purpose of inducing a uniform downward flow of air to the slots 20. Each of the turning vanes 40 is individually supported on a separate shaft 41 for transverse extension across the lower wall portion of the nacelle 16.

The shafts 41 have their axes spaced on a progressively increasing radius of curvature between the leading edge and the trailing edge of the wing 13. The shafts 41 and their vanes 40 are in spaced relation above the lower surface of the wing for defining a cavity from which the air is distributed to the slots 20. The line of curvature containing the spaced axes of the shafts 41 generally corresponds with the streamlined cross-sectional configuration of the upper wing surface. The shafts 41 are jointly controlled for adjustment of the turning vanes 40 between an open parallel relation (see FIGURE 3) and a closed edge-to-edge relation.

It should be understood that the shafts 41 may be rotated about their longitudinal axes by mechanical linkage well known in the art. That is, levers may be fixedly joined to the extremities of the shafts 41 and mechanical linkage employed from the cockpit to drive the levers.

Each of the vanes 40 is relatively thin and streamlined. In the spaced parallel relation, the vanes 40 are disposed to guide the air diverted from the horizontal passage 17 downwardly and uniformly toward the peripheral slots 20. In this relation, the more forward vanes, which are forward of a vertical plane through the centerline of the wings 13 and above the forward slots 20, are pitched and given an increased degree of curvature. Thus, these vanes force a quantity of the air in a somewhat forward and downward direction through the slots 20, which are adjacent the leading wing surface, so as to more uniformly distribute the flow of air to the slots 20.

It should be understood that the velocity of air being forced rearwardly through the nacelle 16 and downward to the slots 20 should be maintained substantially constant. The more forward vanes remove a significant amount of air from the airstream before the airstream reaches the more rearward vanes. Accordingly, the interior curvature of the nacelle door 35 is chosen so as to choke the cross-sectional area as the nacelle 16 extends rearward. Thus, as the airstream is moved rearwardly, a decrease in the amount of air is accompanied by a decrease in area through which the airstream is moved. Accordingly, the velocity of the airstream is maintained substantially constant during its entire traversal of the passage 17.

In order to regulate the angular disposition of the nacelle door 35 between its closed and open positions, an actuator assembly may take the general form of a hydraulic cylinder 46 having oppositely directed piston rods 47 and 48. The upper piston rod 47 is pivotally secured to the forward interior end of the nacelle door 35. The lower rod 48 is pivotally secured to the bottom wall of the nacelle 16 just forwardly of the leading edge 14 of the wing surface.

While it is considered preferable to employ an actuator on each of the transverse extremities of the nacelle door 35, the angular disposition of the door 35 may be accomplished in various manners as desired. Additionally, it should be understood that the actuator assembly may be driven as desired such as by hydraulic or electrical actuating means.

The door 35 may be withdrawn inwardly about its hinge point 37 to any desired angular degree between the fully closed and open positions, as illustrated, by reducing, for example, the fluid pressure with the hydraulic cylinder 46. It is important to note in this connection that, as the door 35 is withdrawn inwardly to control the quantity of air passing through the discharge opening 36, the outer convex surface 39 of the door 35 will act as a control surface to produce a lift reaction in response to the high velocity flow of air through the discharge opening 36. The lift action is in the same manner as obtained from an airplane wing since the door 35 has the same effective shape as does the airplane wing.

Because of the rearward and downward curvature of the control surface 39 incremental lift results from increased quantities of air discharged through the opening 36. This increment of lift closely approximates the decrement in lift resulting from reduced air flow through the vertical duct system until the thrust forces amount to approximately one third of the vertical thrust. Accordingly, the control surface 39 will develop maximum lift when positioned in some intermediate position, when forward thrust forces become approximately one third of the vertical thrust. That is, as the door 35 is moved inwardly and downwardly from this intermediate position of maximum lift, separation of air from the control surface takes place because of the curvature of surface 39. This separation causes decrement in lift such that overall lift is not completely maintained when the door 35 is opened and forward thrust forces become approximately one third of the vertical thrust forces.

Maximum propulsive efficiency is obtained by closing the turning vanes 40 to block the downward flow of air. In this manner, the air will be constrained to flow horizontally through the discharge opening 36 for integrated lift and propulsion of the aircraft. Throughout all positions of movement, it is to be noted that the control surface 39 will afford a relatively large surface area for lift generation when acted upon by the discharge air without obstructing its flow.

While, as described herein, the vanes 40 preferably are closed at approximately the intermediate nacelle door position of maximum lift, it should be understood that they may be operated in unison with the door 35. That is, the closure of the vanes 40 may, if desired, be synchronized with the opening of the nacelle door 35. In this manner, the vanes 40 would begin to close as the nacelle door 35 is opened and would continue to close until the nacelle door has approximately reached its position of maximum lift.

In hover and invertical or short takeoff the nacelle door 35 is set in the closed position, as shown in FIGURE 3, so that the airstream is diverted downwardly and guided by the open turning vanes 40 towards the slots 20. In transition, as shown in FIGURE 4, the door 35 is partially withdrawn inwardly to permit some air to flow through the discharge opening 36 in order to develop forward thrust while the craft largely continues to be supported by vertical forces. Such vertical forces may be reaction on the undercarriage of the aircraft, thrust created by air momentum, or air cushion. However, as inward angular movement of the door 35 increases, forward propulsion will increase while a decreasing amount of air is diverted through the vertical lift system. Nevertheless, as previously described, the door control surface 39 develops an increment in lift, which depends on the amount of air flow through the discharge opening 36 and the position of the door. However, the incremental lift therefrom is closely comparable to decrement in lift until the door 35 is opened sufficiently to allow forward thrust to become one third of the vertical thrust. Finally, the forward flight position shown in FIGURE 5, the adjustable turning vanes 40 preferably are closed so that all discharge air is forced through the discharge opening 36 for maximum propulsion and some lift.

While the position of the door 35 is the lowest position illustrated in the drawings, it should be understood that it may be lowered as desired. That is, the door 35 may be lowered so that it extends substantially along the upper surfaces of the vanes 40. Accordingly, the door 35 would substantially take the position of the upper surface. Thus, in this position, the door would react substantially like a portion of the wing.

From the foregoing description of a preferred embodiment of the present invention, it will be evident that the airfoil section as defined by the movable aft nacelle door 35 is conformable for use in various different applications. For instance, it may be used individually or in combination with various forms of vertical lift systems for aircraft. However, it is believed to be especially unique in the manner in which it cooperates with the vertical lift system described. That is, advantageous lift and thrust combinations are achieved while undergoing transition from hovering and vertical ascent to forward flight. Additionally, these advantageous lift and thrust combinations are available during operation of short takeoff and landing aircraft, which incorporate floats or conventional type undercarriages.

For purposes of exemplification, a particular embodiment of the invention has been shown and described according to the present understanding thereof. However, it will be apparent that changes and modifications in the arrangement and construction of the parts thereof may be resorted to without departing from the spirit and scope of the invention.

We claim:

1. In an aircraft having a body, a propulsion unit, and an air discharge duct defining a discharge flow passage for said propulsion unit, the combination of an adjustable airfoil section traversing the outlet end of the flow passage and being mounted for angular movement across the flow passage to control the capacity of air flow therethrough, said airfoil section having an outer control surface extending rearwardly and outwardly to aid in controlling the direction of thrust by providing a lifting force through the action of the discharged gases across the airfoil, the portion of said outer control surface providing the effective lifting force extending rearwardly of the upper portion of the discharge duct, and said airfoil section including means for adjustably controlling the angular disposition of said airfoil section in the flow passage.

2. In an aircraft having a body, a propulsion unit, and an air discharge duct defining a discharge flow passage for said propulsion unit, the combination of an adjustable airfoil section in the flow passage and being mounted for forward angular movement across the flow passage to control the capacity of air flow therethrough, said airfoil section having generally convex exterior control surface means with a portion of the exterior control surface means extending rearwardly of the upper portion of the discharge duct, the portion of the exterior control surface means extending rearwardly of the upper portion of the discharge duct being reacted upon by the air discharged through said duct to produce lift, and said airfoil section including means for adjustably controlling the angular disposition thereof for integrated lift and propulsion of the aircraft.

3. An integrated lift and propulsion unit for an aircraft comprising a housing having a main passage therein, means in said main passage for moving air therethrough, said housing having first and second discharge outlets, means for controlling air flow through said first discharge outlet to provide lift and for selectively blocking air flow through said first outlet, and means movable into and out of said second outlet for controlling air flow therethrough and for reacting to the air flow through said second outlet to provide lift, the portion of said means providing the effective lifting reaction extending rearwardly of the upper portion of said second discharge outlet, whereby as said first outlet is being closed and lift therefrom decreases and as said second outlet is being opened and forward thrust and lift from said movable means increases an incremental lifting force is produced that approximates the decrement of lift resulting from reduced air flow through said first outlet.

4. An integrated lift and propulsion unit for an aircraft comprising a main flow duct, means for moving air therethrough, said main flow duct having first outlet means for providing lift; said main flow duct having second outlet means for providing forward thrust, means for selectively opening and closing said first outlet means for controlling lift therefrom, and adjustable airfoil means movable into and out of said second outlet means for increasing and decreasing forward thrust while decreasing and increasing respectively lift from said first outlet means and for coacting with the air passing through said second outlet means to maintain lift as lift from said first outlet means decreases, the adjustable airfoil means for obtaining lift extending rearwardly of the second outlet means, whereby an incremental lifting force is produced that approximates the decrement of lift resulting from reduced air flow through said first outlet means.

5. An integrated lift and propulsion unit for an aircraft comprising a housing having a main passage therein, means in said main passage for moving air therethrough, said housing having first outlet means for providing lift, said housing having second outlet means for providing forward thrust, means for selectively opening and closing said first outlet means for controlling lift therefrom, and adjustable means movable into and out of said second outlet means for increasing forward thrust during movement out of said second outlet means and for decreasing forward thrust during movement into said second outlet means while decreasing and increasing respectively lift from said first outlet means, a portion of said adjustable means extends rearward of the upper portion of said second outlet means, said adjustable means being responsive to air flowing through said second outlet means over the portion extending rearwardly of the upper edge of said second outlet means for providing maximum lift at a predetermined position in its movement in closing and opening, said first predetermined position being determined by the division of thrust output of the propulsion unit to the first outlet means and the second outlet means, whereby an incremental lifting force is produced that approximates the decrement of lift resulting from reduced air flow through said first outlet means.

6. An integrated lift and propulsion unit for an aircraft comprising a main substantially horizontal flow duct, a propulsion unit mounted at the inlet end of said flow duct for the rearward discharge of air through the outlet end thereof, downwardly directed duct means communicating with said flow duct adjacent to the outlet end thereof with adjustable guide means between said flow duct and said duct means for regulating the flow of air through said duct means, and an adjustably mounted door including means for moving said door into different forwardly and upwardly inclined positions across the outlet end in order to control the relative flow capacity of air through said duct means and the outlet end, and said door presenting an outer control surface having a portion extending rearwardly of the upper portion of the outlet duct and curving rearwardly and downwardly throughout all degrees of movement of said door and cooperating with said duct means to develop a lift reaction over a portion of the outer surface which extends rearwardly of the upper portion of the outlet duct when air is discharged through the outlet end of said flow duct in such relative flow capacity that the total thrust developed by the propulsion unit is divided into approximately ⅓ acting through said outlet end and approximately ⅔ acting through said downwardly directed duct means.

7. An integrated lift and propulsion system according to claim 6, said guide means for said duct means being movable between an open position directing the flow of air downwardly through said duct means and a closed position blocking the flow of air to said duct means.

8. In an aircraft having a fuselage and wings, the combination comprising a propulsion unit for each of said wings, a nacelle of enlarged substantially cylindrical configuration mounted on each of said wings for mounting each propulsion unit in said wings, said nacelle including a forward inlet end and an aft upper surface portion trailing rearwardly into the wing with a discharge opening therein aligned with the propulsion unit mounted therein to define a discharge passage for substantially horizontal flow of air therethrough, and a movable nacelle door disposed in the discharge opening and conforming in contour to the aft upper surface portion of said nacelle, said door being pivotal about a substantially horizontal axis for downward angular movement through the discharge passage from a closed position blocking the flow of air through the discharge opening to an open position, and the outer surface of said door curving rearwardly and downwardly to develop a lift reaction over a portion of the outer surface which extends rearwardly of the upper portion of the discharge opening in response to air discharged through the passage thereby providing for integrated lift and forward propulsion of the aircraft.

9. In an aircraft having a fuselage and wings, the combination of an integrated lift and propulsion system for each of said wings including a propulsion unit and a nacelle on each of said wings, said nacelle including a forward inlet end an an aft upper surface portion curving rearwardly and downwardly into the trailing edge of one of said wings with a discharge opening therein aligned with said propulsion unit to define a passage for substantially horizontal discharge of air therethrough, peripheral downwardly directed slots disposed in each of said wings being in communication with the passage adjacent to the discharge opening and adjustable turning vanes interpositioned between the passage and the slots with said vanes being movable between an open position directing air downwardly through the slots and a closed position blocking the downward flow of air from the passage, and a movable aft nacelle door disposed in the discharge opening and conforming in contour to the aft upper surface portion of said nacelle, said door being hinged about a horizontal axis adjacent to the trailing edge of one of said wings and including means operative to provide for downward angular movement of said door through the passage from a closed position blocking the flow of air through the discharge opening to an open position, said door having its inner surface deflecting air downwardly toward said turning vanes for discharge through the slots and its outer surface curving rearwardly and downwardly across the discharge opening to provide for integrated lift and forward propulsion of the aircraft, the portion of the outer surface of the door causing lift extending rearwardly of the upper portion of the discharge opening.

10. In an aircraft according to claim 9, said turning vanes extending transversely across the lower portion of said nacelle and being angularly disposed in relation to the flow of air diverted by said door so as to provide for uniform distribution of air through the slots.

References Cited in the file of this patent

UNITED STATES PATENTS

| | | |
|---|---|---|
| 2,802,333 | Price | Aug. 13, 1957 |
| 2,968,452 | Cook | Jan. 17, 1961 |

FOREIGN PATENTS

| | | |
|---|---|---|
| 219,133 | Australia | Nov. 24, 1958 |